US012789366B2

(12) United States Patent
Kang et al.

(10) Patent No.: US 12,789,366 B2
(45) Date of Patent: Nov. 10, 2026

(54) SYSTEM AND METHOD FOR SCREENING MOTION DATA

(71) Applicant: ELECTRONICS AND TELECOMMUNICATIONS RESEARCH INSTITUTE, Daejeon (KR)

(72) Inventors: Sang Seung Kang, Daejeon (KR); Youngwoo Yoon, Daejeon (KR); Jae Hong Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 19/066,904

(22) Filed: Feb. 28, 2025

(65) Prior Publication Data

US 2025/0282049 A1 Sep. 11, 2025

(30) Foreign Application Priority Data

Mar. 5, 2024 (KR) ........................ 10-2024-0031142

(51) Int. Cl.

| | |
|---|---|
| ***B25J 9/00*** | (2006.01) |
| ***B25J 9/16*** | (2006.01) |
| ***B25J 11/00*** | (2006.01) |
| ***G06T 7/20*** | (2017.01) |
| ***H04L 9/32*** | (2006.01) |

(52) U.S. Cl.

CPC ............. *B25J 9/163* (2013.01); *B25J 9/1653* (2013.01); *B25J 11/0005* (2013.01); *G06T 7/20* (2013.01); *H04L 9/3236* (2013.01); *H04L 9/3297* (2013.01); *G06T 2207/20081* (2013.01)

(58) Field of Classification Search

CPC ...... B25J 9/163; B25J 9/1653; B25J 11/0005; G06T 7/20; G06T 2207/20081; H04L 9/3236; H04L 9/3297

See application file for complete search history.

(56) References Cited

U.S. PATENT DOCUMENTS

| | | | | |
|---|---|---|---|---|
| 10,518,412 | B2 * | 12/2019 | Ayusawa | B25J 9/1664 |
| 11,331,802 | B2 * | 5/2022 | Lin | B25J 13/088 |
| 2009/0326679 | A1 * | 12/2009 | Iba | G06N 3/004 901/4 |
| 2011/0128292 | A1 | 6/2011 | Ghyme et al. | |
| 2011/0213494 | A1 * | 9/2011 | Orita | B62D 57/032 901/1 |

(Continued)

FOREIGN PATENT DOCUMENTS

| | | |
|---|---|---|
| KR | 10-1021470 B1 | 3/2011 |
| KR | 10-2223687 B1 | 3/2021 |

(Continued)

*Primary Examiner* — Truc M Do

(74) *Attorney, Agent, or Firm* — Rabin & Berdo, P.C.

(57) ABSTRACT

Provided is a method of screening motion data. The method includes extracting motion key point information from a motion data set, determining whether motion data corresponding to the extracted motion key point information are valid data based on at least one of predetermined auxiliary information and a pre-stored reference motion model, and screening motion data for learning from the motion data set based on a motion variation of the motion data when the motion data are valid data as a result of the determination.

16 Claims, 9 Drawing Sheets

(56) References Cited

U.S. PATENT DOCUMENTS

| | | | | |
|---|---|---|---|---|
| 2016/0253999 | A1* | 9/2016 | Kang | G10L 17/00 704/249 |
| 2017/0028552 | A1 | 2/2017 | Lee | |
| 2019/0070729 | A1* | 3/2019 | Kamioka | B62D 57/032 |
| 2022/0203526 | A1* | 6/2022 | Bai | B25J 9/1651 |
| 2023/0059924 | A1 | 2/2023 | Heinrich et al. | |

FOREIGN PATENT DOCUMENTS

| | | | |
|---|---|---|---|
| KR | 102377001 | B1 | 3/2022 |
| KR | 20220057755 | A | 5/2022 |
| KR | 10-2023-0059160 | A | 5/2023 |

* cited by examiner

SYSTEM AND METHOD FOR SCREENING MOTION DATA

This application claims priority from and the benefit of Korean Patent Application No. 10-2024-0031142, filed on Mar. 5, 2024, which is hereby incorporated by reference for all purposes as if set forth herein.

BACKGROUND

1. Technical Field

The present disclosure relates to a system and method for screening motion data.

2. Related Art

A technology for an interaction between a human being and a robot includes the recognition of a robot for a surrounding environment, the recognition of a subject, motion detection, the interpretation of a language of a human being, the generation of a proper conversation, the understanding of a voice, an imitated voice speech of a human being, the detection of feelings and proper response expressions of a human being, the confirmation of intention of a human being, a response to an incomplete command, learning through a continued interaction, and an improved behavior. Various researches related thereto are in progress. A robot's behavior of imitating and learning a behavior of a human being and making expressions similar to the human being based on the imitation and learning is for making a more plausible and effective interaction process between the human being and the robot. As described above, a robot's behavior of generating proper voice back channeling or a conversation based on the understanding of a natural language command of a human being or the recognition of a conversation and performing a suitable listening motion behavior or a conversation motion behavior may help a natural interaction between the human being and the robot.

Researches in which a robot generates and performs a gesture motion based on a listening response, the generation of a conversation, and the synthesis of a gesture motion suitable for a voice are currently in progress. However, gesture expressions of a robot are not natural because the reality and diversity of an automatically generated motion are insufficient. In order to overcome such a problem, it is necessary to secure proper motion data that are necessary for a robot to generate a conversation gesture motion. However, it is difficult to secure the motion data, and a great deal or costs and efforts are necessary to construct a large amount of data. Furthermore, although motion data for learning are secured, it is necessary to provide technical means for screening and learning meaningful data.

Furthermore, although constructed or secured data are a large scale and are refined through processing and various pre-processing processes, the constructed or secured data may include erroneous data, data which may cause an error, or data which may degrade the generation of a target motion, such as a listening behavior or a conversation behavior. Such data may cause ineffective results because the data act as noise or degrade learning quality in a learning process.

Accordingly, there is a need for an effective data screening method for minimizing a loss in a learning process by separating and extracting data suitable for a target range, detecting and taking measures against implicit data, and separating and excluding data that are not effective in generating a robot gesture motion with respect to refined data.

Prior Art Document

Patent Document

Korean Patent Application Publication No. 10-2023-0059160 (May 3, 2023)

SUMMARY

Various embodiments are directed to providing a system and method for screening motion data, which enable a robot gesture motion to be effectively generated by analyzing motion information from a motion data set and selectively constructing motion data for learning in order to generate the robot gesture motion.

However, objects of the present disclosure to be achieved are not limited to the aforementioned object, and other objects may be present.

A method of screening motion data according to a first aspect of the present disclosure includes extracting motion key point information from a motion data set, determining whether motion data corresponding to the extracted motion key point information are valid data based on at least one of predetermined auxiliary information and a pre-stored reference motion model, and screening motion data for learning from the motion data set based on a motion variation of the motion data when the motion data are valid data as a result of the determination.

Furthermore, a system for screening motion data according to a second aspect of the present disclosure includes a motion data extraction unit configured to extract motion key point information from a motion data set, a motion data determination unit configured to determine whether motion data corresponding to the extracted motion key point information are valid data based on at least one of predetermined auxiliary information and a pre-stored reference motion model, and a motion data screening unit configured to screen motion data for learning from the motion data set based on a motion variation of the motion data when the motion data are valid data as a result of the determination.

A computer program according to another aspect of the present disclosure executes the system and method for screening motion data and is stored in a computer-readable recording medium.

Other details of the present disclosure are included in the detailed description and the drawings.

According to the embodiments of the present disclosure, the quality and validity of motion data can be improved and excellent data can be easily selected, by precisely analyzing motion information from an input motion data set, detecting an error occurred, effectively recovering the error, and screening motion data through correction and the incorporation of a weight according to a motion variation. Accordingly, there is an advantage in that a substantial help is provided to generate a robot gesture motion because effects of learning using motion data can be substantially enhanced.

Furthermore, an embodiment of the present disclosure enables an interaction process between a robot and a human being to be performed more naturally and effectively because high-quality data that complies with an object are screened and applied to a learning model.

Effects of the present disclosure which may be obtained in the present disclosure are not limited to the aforementioned effects, and other effects not described above may be evidently understood by a person having ordinary knowledge in the art to which the present disclosure pertains from the following description.

DETAILED DESCRIPTION

Figure 1:
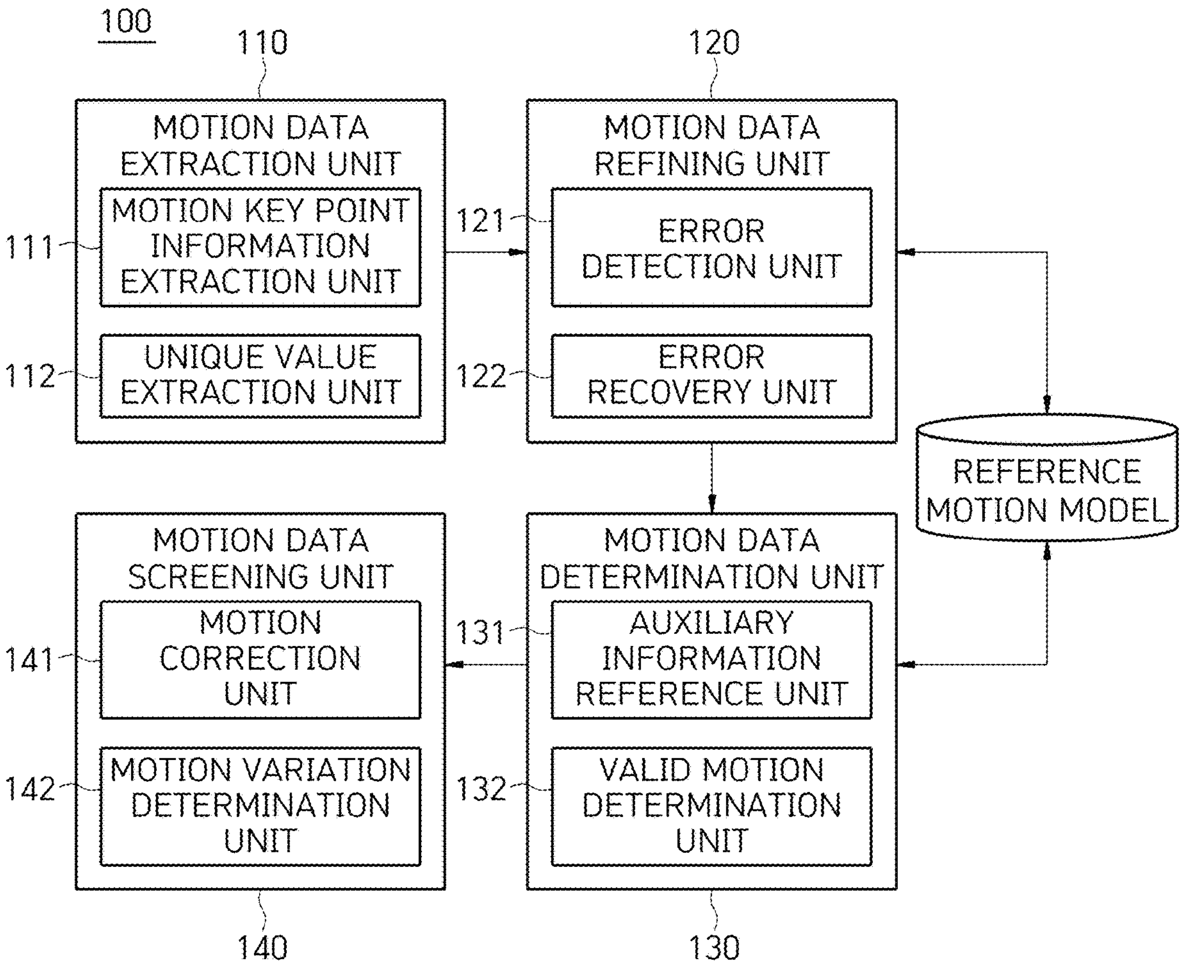
FIG. 1 is a block diagram of a system for screening motion data according to an embodiment of the present disclosure.

Advantages and characteristics of the present disclosure and a method for achieving the advantages and characteristics will become apparent from the embodiments described in detail later in conjunction with the accompanying drawings. However, the present disclosure is not limited to embodiments disclosed hereinafter, but may be implemented in various different forms. The embodiments are merely provided to complete the present disclosure and to fully notify a person having ordinary knowledge in the art to which the present disclosure pertains of the category of the present disclosure. The present disclosure is merely defined by the claims.

Terms used in this specification are used to describe embodiments and are not intended to limit the present disclosure. In this specification, an expression of the singular number includes an expression of the plural number unless clearly defined otherwise in the context. The term "comprises" and/or "comprising" used in this specification does not exclude the presence or addition of one or more other elements in addition to a mentioned element. Throughout the specification, the same reference numerals denote the same elements. "And/or" includes each of mentioned elements and all combinations of one or more of mentioned elements. Although the terms "first", "second", etc. are used to describe various components, these elements are not limited by these terms. These terms are merely used to distinguish between one element and another element. Accordingly, a first element mentioned hereinafter may be a second element within the technical spirit of the present disclosure.

All terms (including technical and scientific terms) used in this specification, unless defined otherwise, will be used as meanings which may be understood in common by a person having ordinary knowledge in the art to which the present disclosure pertains. Furthermore, terms defined in commonly used dictionaries are not construed as being ideal or excessively formal unless specially defined otherwise.

Embodiments of the present disclosure relate to a system 100 and method for screening motion data.

Embodiments of the present disclosure are directed to selectively providing substantial and effective motion data in learning for the generation of a gesture motion of a robot by extracting motion key point information and a unique value, detecting and recovering an error included in motion data, correcting a corresponding motion and analyzing a motion variation, with respect to a motion data set including motion information.

Hereinafter, the system 100 for screening motion data according to an embodiment of the present disclosure is described with reference to FIGS. 1 to 3.

FIG. 1 is a block diagram of the system 100 for screening motion data according to an embodiment of the present disclosure.

The system 100 for screening motion data according to an embodiment of the present disclosure is for selectively providing motion data for learning through the analysis of motion key point information for motion data, and is directed to enabling learning for the generation of substantial and effective robot motion by excluding data that are ineffective for the generation of a robot motion and screening data that are effective for learning. The system 100 for screening motion data includes a motion data extraction unit 110, the motion data refining unit 120, a motion data determination unit 130, and a motion data screening unit 140.

The motion data extraction unit 110 includes a motion key point information extraction unit 111 and a unique value extraction unit 112.

The motion key point information extraction unit 111 extracts motion key point information from a motion data set. That is, the motion key point information extraction unit 111 extracts two-dimensional (2-D) or three-dimensional (3-D) motion key point information for motion data that are input from a motion data set.

The unique value extraction unit 112 generates a unique value of motion data including at least one of motion doer profile information, data type information, and initial motion key point information for input motion data in order to define the uniqueness of the input motion data.

The motion data refining unit 120 analyzes, detects, and recovers an error of extracted motion key point information, and includes an error detection unit 121 and an error recovery unit 122.

The error detection unit 121 detects an error of extracted motion key point information by analyzing the extracted motion key point information based on a reference motion model 150.

When detecting an error of motion data, the error recovery unit 122 performs recovery on the detected error. In this case, the error recovery unit 122 may recover the motion data based on similarity using the reference motion model 150. The error recovery unit 122 may recover the motion data by analyzing a missing value or outlier value of motion key point information, along with or separately from the recovery of the motion data based on similarity.

The motion data determination unit 130 determines whether motion data are valid, and includes an auxiliary information reference unit 131 and a valid motion determination unit 132.

The auxiliary information reference unit 131 determines whether motion data are valid with reference to auxiliary information that is helpful to determine whether the motion data are valid. In this case, the auxiliary information may include at least one of speech voice information included in the motion data, speech voice information that is constructed independently of the motion data, and annotation information corresponding to the motion data.

The valid motion determination unit 132 may determine whether motion data are valid by using the reference motion model 150. The valid motion determination unit 132 may determine motion data belonging to a preset valid section to be valid by analyzing similarity between the motion data and the reference motion model 150.

The motion data screening unit 140 is for screening motion data for learning with respect to valid data, and includes a motion correction unit 141 and a motion variation determination unit 142.

The motion correction unit 141 may correct reference location information by calculating an intermediate value of a motion for a key point that constitutes the center of a motion doer.

The motion variation determination unit 142 may calculate a motion variation of a motion doer, that is, a motion variation of motion data, and may select motion data for learning by incorporating a weight according to the motion variation.

Figure 2:
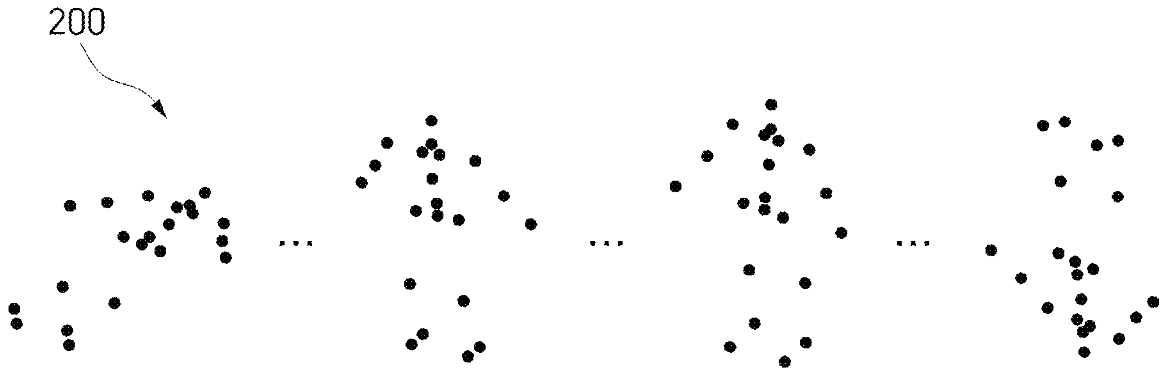
FIG. 2 is a diagram for describing a reference motion model in an embodiment of the present disclosure.

FIG. 2 is a diagram for describing the reference motion model 150 in an embodiment of the present disclosure.

In an embodiment of the present disclosure, models that are necessary for similarity analysis have been previously constructed in the reference motion model 150. The models may include reference key point information 200 constructed to have the same format as 2-D or 3-D motion key point information defined in a motion data set.

In this case, the 2-D or 3-D motion key point information may mean information on the locations of key points that describe a motion. That is, the motion key point information may be expressed as a series of array values that record a change of a motion over time or may be indicated as skeleton information.

Figure 3:
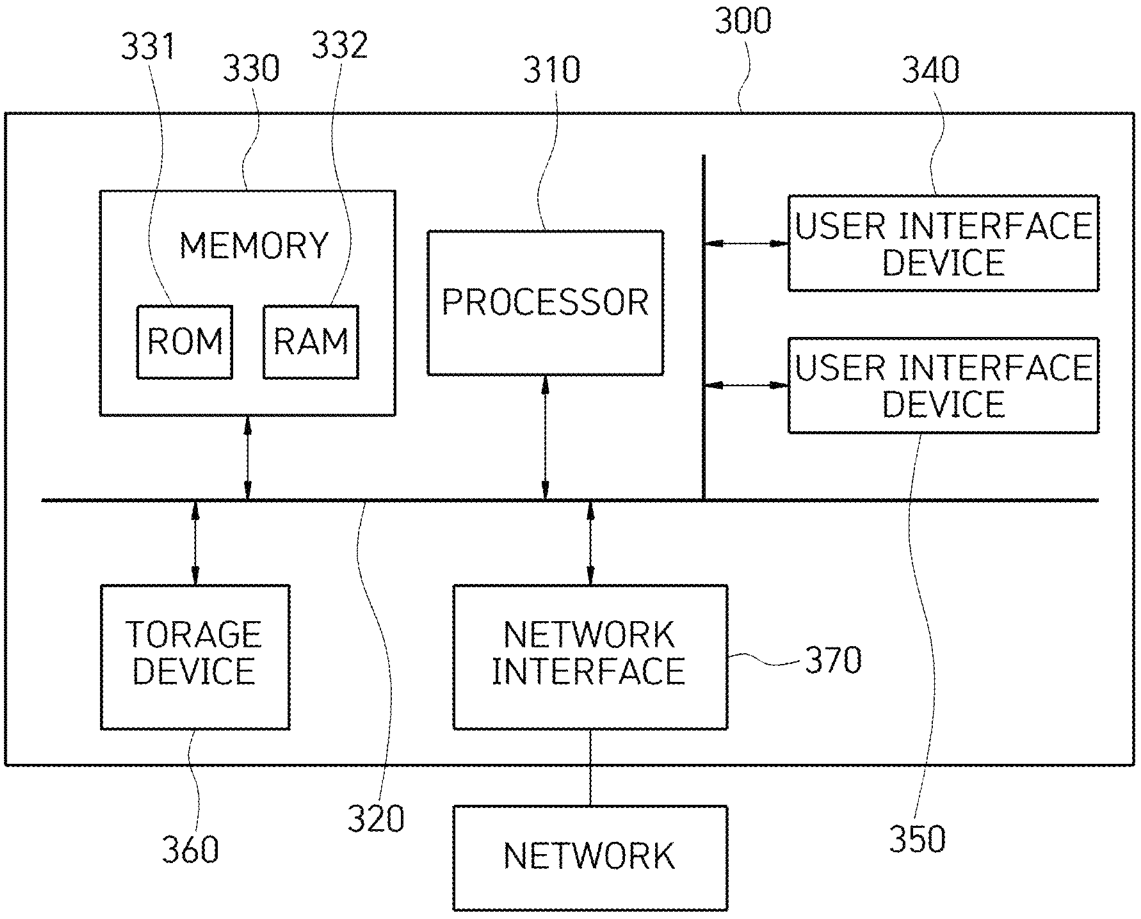
FIG. 3 is a block diagram of the system for screening motion data according to an embodiment of the present disclosure.

FIG. 3 is a block diagram of the system 100 for screening motion data according to an embodiment of the present disclosure.

The system 100 for screening motion data according to an embodiment of the present disclosure may be constructed with a computing device 300. The computing device 300 may include at least one of a processor 310, memory 330, a user interface input device 340, a user interface output device 350, and a storage device 360 which communicate with each other through a bus 320. The computing device 300 may further include a network interface 370 that is electrically connected to a network, for example, a wireless network. The network interface 370 may transmit or receive data to or from another network entity over a network.

The processor 310 may be implemented with various types, such as an application processor (AP), a central processing unit (CPU), and a graphic processing unit (GPU), and may be an arbitrary semiconductor device that executes an instruction stored in the memory 330 or the storage device 360. The processor 310 may be constructed to implement functions and methods described with reference to FIGS. 1 and 2 and FIGS. 4 to 9 described later.

The memory 330 and the storage device 360 may include various forms of volatile or nonvolatile storage media. For example, the memory may include read-only memory (ROM) 331 and random access memory (RAM) 332. The memory 330 may be disposed inside or outside the processor 310. The memory 330 may be connected to the processor 310 through various means that are already known.

Hereinafter, a method that is performed by the system 100 for screening motion data according to an embodiment of the present disclosure is described more specifically with reference to FIGS. 4 to 9.

Figure 4:
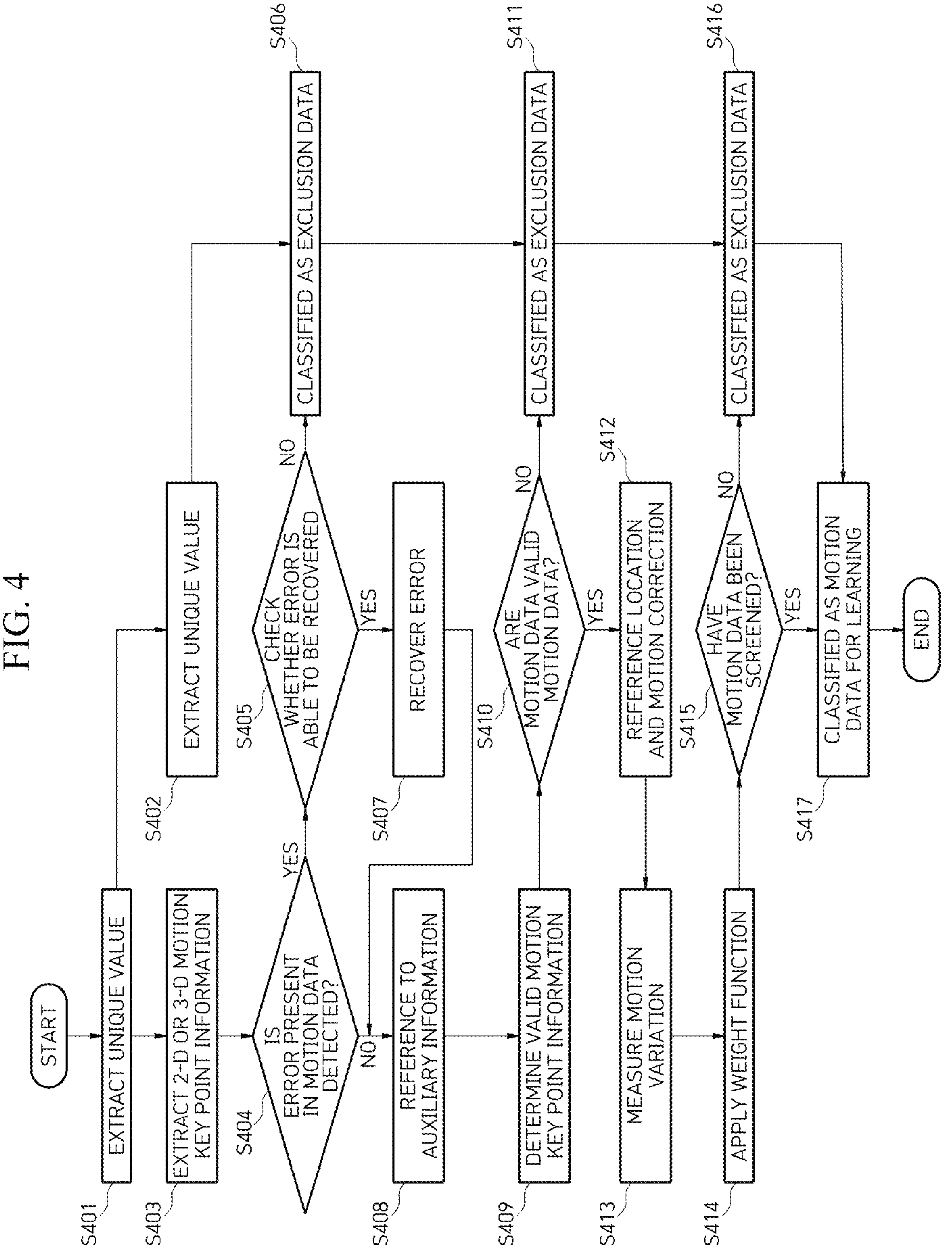
FIG. 4 is a flowchart of a method of screening motion data according to an embodiment of the present disclosure.

FIG. 4 is a flowchart of a method of screening motion data according to an embodiment of the present disclosure.

First, data having a form that complies with an object, such as an individual data file, session data, or separate data in a learning processing unit are input from a motion data set to be used (S401).

Next, a unique value for defining the uniqueness of the input data is extracted (S402). In this case, the unique value may include at least one of motion doer profile information, data type information, and initial motion key point information or may be obtained by processing a combination of the motion doer profile information, the data type information, and the initial motion key point information.

Next, 2-D or 3-D motion key point information corresponding to motion key point information is extracted from the input data (S403). In this case, the motion key point information may be information that is constructed with points indicative of an operation or motion of corresponding motion data.

Next, whether an error is present in the motion data is detected by analyzing the extracted motion key point information (S404). When the error is present, the error is recovered by applying a similarity analysis scheme based on the reference motion model or applying a missing value or outlier value analysis scheme to the error (S405 and S407). When it is determined that the error cannot be recovered (S405), the corresponding motion key point information is classified as exclusion data (S406).

Next, when an error is not present or reference to auxiliary information is possible with respect to motion key point information having an error recovered, whether the motion key point information is valid motion key point information is determined with reference to the auxiliary information (S408 and S409). In contrast, when reference to the auxiliary information is impossible, whether the motion key point information is valid motion key point information is determined by analyzing similarity based on the reference motion model (S409).

Next, whether the motion data are valid motion data is checked (S410) by determining whether the motion data are a motion corresponding to a frame within a valid section or are a similarity suitability motion, based on whether the motion key point information is valid motion key point information. When the motion data are not valid motion data, the corresponding motion data are classified as exclusion data (S411).

In contrast, when the motion data are not valid motion data, a process of correcting a reference location and the motion may be performed by calculating an intermediate value of the motion for a motion key point that constitutes the center of a motion doer (S412).

Next, a motion variation, that is, a variation of the motion of the motion doer is measured (S413). A weight function according to the motion variation is applied (S414). Whether the motion data have been screened is checked by calculating a selection index, that is, the results of the application of the weight function (S415). Motion data that have not been screened as a result of the check are classified as exclusion data (S416). Data that have been screened are classified as motion data for learning (S417).

The unique value generated in step S402 may be used as unique information of the motion data classified as the motion data for learning. Furthermore, the unique value may be used as unique information of the motion data classified as the exclusion data in steps S406, S411, and S416.

Figure 5:
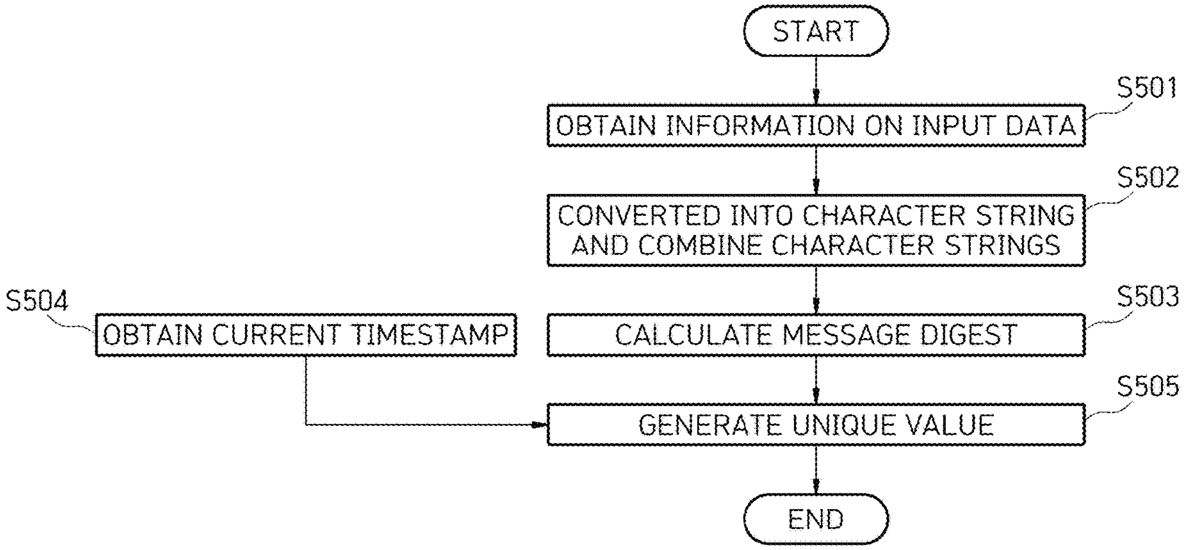
FIG. 5 is a diagram for specifically describing a step of generating a unique value in an embodiment of the present disclosure.

FIG. 5 is a diagram for specifically describing a step of generating a unique value in an embodiment of the present disclosure.

First, information on input data is obtained by extracting at least one of motion doer profile information, data type information, and initial motion key point information from a motion data set, that is, the input data (S501).

Next, each of the extracted motion doer profile information, data type information, and initial motion key point information is converted into a character string, and the character strings are combined (S502). This defines the existing data in a consistent form by expressing each of the extracted motion doer profile information, data type information, and initial motion key point information in a text form, and the converted motion doer profile information, data type information, and initial motion key point information are combined as one character string. For example, if motion doer profile information, data type information, and initial motion key point information are extracted, one large character string may be formed by expressing each of the motion doer profile information, the data type information, and the initial motion key point information as a character string and combining the character strings.

Next, a message digest may be calculated (S503) by applying a hash function to the combined character string. A unique value may be generated by combining a current timestamp with the message digest (S504 and S505). The hash function generates the message digest, that is, a character string having a fixed length. An input character string is characterized in that an output value is greatly changed even though the input character string is slightly changed. The uniqueness of the input character string can be guaranteed by using such a characteristic. Furthermore, the uniqueness of input data at specific timing can be guaranteed by combining a current timestamp with the message digest.

A process of generating the unique value is expressed as an equation as follows (Equation 1). In a process of extracting predetermined information from a motion data set (S501), motion doer profile information ($M_{UP}$), data type information ($M_{DT}$), and initial motion key point information ($M_{IM}$) may be extracted. Each of the motion doer profile information, the data type information, and the initial motion key point information is converted into a character string, and the converted character strings are combined into one character string ($M_S$) (S502).

Furthermore, a message digest ($H(M_S, K_S)$) for the combined character string ($M_S$) is calculated (S503). A unique value ($V_{ID}$) is derived based on current timestamp information ($M_{TS}$) (S504 and S505). In this case, the header ($M_h$) of the message digest may be a bit string having a predetermined length, which is generated by using a secret key ($K_S$) and an encryption hash algorithm (H) with respect to the message of the combined character string ($M_S$).

$$M_S = f(M_{UP}, M_{DT}, M_{IM}) \quad (1)$$

$$V_{ID} = g(M_{TS}, H(M_S, K_S))$$

The unique value may be generated in a universally unique identifier (UUID) format based on time, based on the current timestamp information. The generated unique values may be aligned based on time. Furthermore, the unique value may be used by being generated in the UUID format that is dependent on randomness. The unique value that is not redundant because the randomness of the unique value is guaranteed may be generated. Alternatively, a character string construction rule may be previously defined and used.

Figure 6:
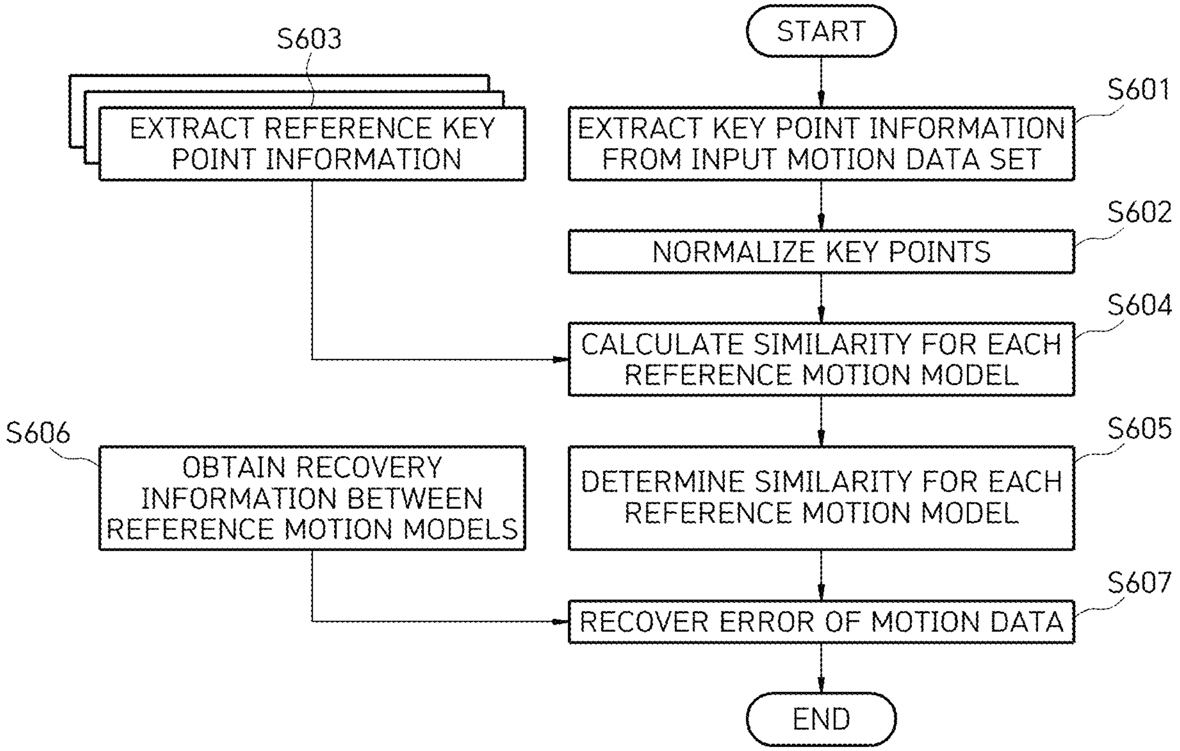
FIG. 6 is a diagram for specifically describing an error recovery step based on reference motion similarity in an embodiment of the present disclosure.

FIG. 6 is a diagram for specifically describing an error recovery step based on reference motion similarity in an embodiment of the present disclosure.

In an embodiment of the present disclosure, when an error is present, the error may be recovered (S405 and S407) by applying a similarity analysis scheme based on the reference motion model or applying a missing value or outlier value analysis scheme. The error recovery step based on reference motion similarity is described in detail with reference to FIG. 6.

First, when 2-D or 3-D motion key point information is extracted from an input motion data set (S601), two or more major key points that constitute a body are selected in the motion key point information, and are normalized (S602). For example, in the normalization of the key points, two key points that are necessary for normalization may be selected by adjusting the scale of the body of a human being, such as head and hip points or head and feet points.

Next, reference key point information is extracted from the reference motion model (S603). Similarity for each reference motion model is calculated based on similarity between the reference key point information and the normalized key point (S604). Similarity for each reference motion model is determined based on the calculated similarity (S605). In this case, the calculation of the similarity includes measuring similarity between the normalized key point information and the reference key point information of the reference motion model. For example, a method, such as Euclidean distance measurement or Manhattan distance measurement with respect to information on the location of each key point, may be used in the calculation of the similarity. Furthermore, the similarity for each reference motion model may be determined by comparing a preset threshold value with calculated similarity.

Next, recovery information between the reference motion models, including up-and-down and left-and-right inversion information for reference key point information of the reference motion model, is obtained (S606). The error of the motion data is recovered based on the recovery information and a reference motion of the reference motion model, which is determined to be similar as a result of the determination (S607).

Figure 7:
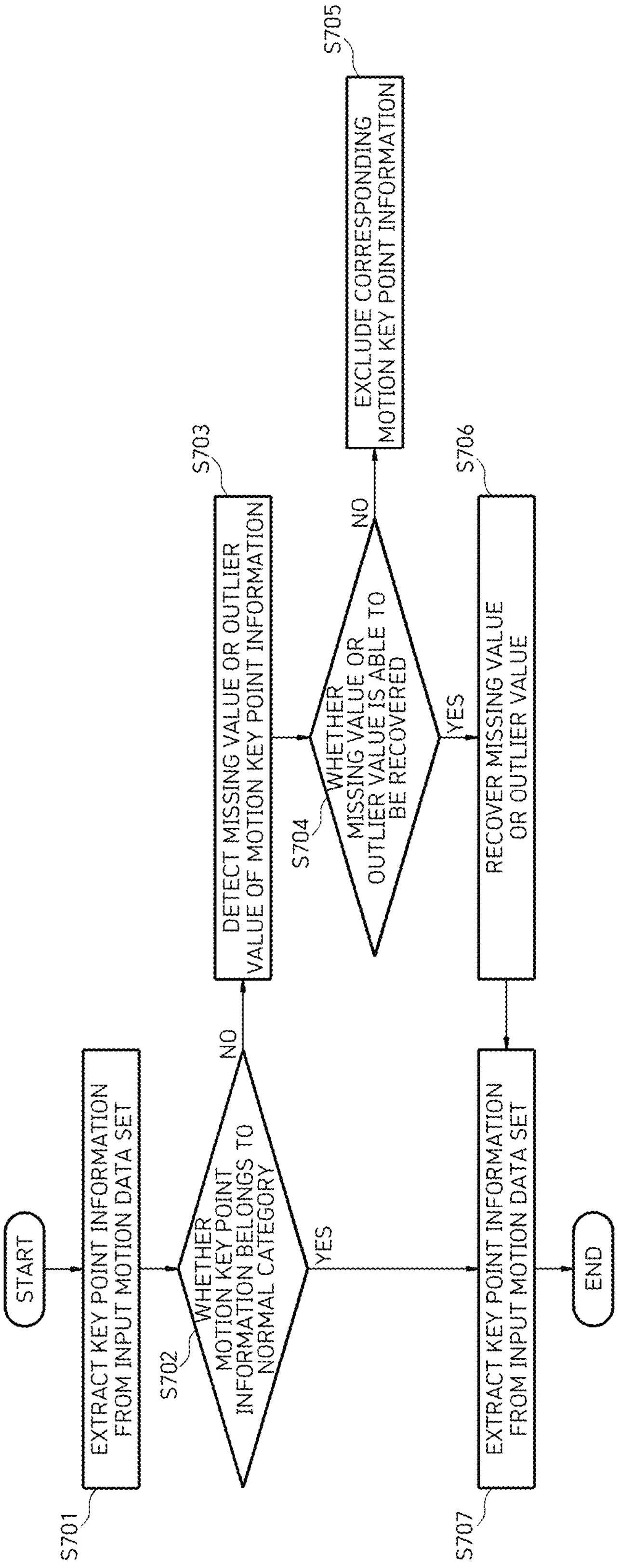
FIG. 7 is a diagram for specifically describing an error recovery step based on the analysis of a missing value or an outlier value in an embodiment of the present disclosure.

FIG. 7 is a diagram for specifically describing an error recovery step based on the analysis of a missing value or an outlier value in an embodiment of the present disclosure.

First, when 2-D or 3-D motion key point information is extracted from an input motion data set (S701), whether the extracted motion key point information belongs to a preset normal category is determined (S702). In this case, the normal category means a category that is expected to be normal in general, and may be preset as the category of a normal key point value that is expected in motion data.

When the extracted motion key point information does not belong to the normal category as a result of the determination, a missing value or outlier value of the motion key point information is detected (S703). In this case, the missing value means a case in which data have been omitted. The outlier value means a case in which data are determined to have a value that falls outside an expected value. In this case, the detection of the missing value of the motion key point information may include detecting a special value, such as "not a number" (NaN), null, or a value that falls outside the range of an output value, with respect to key point information of each frame. Furthermore, the detection of the outlier value of the motion key point information may include detecting a value that falls outside a common pattern with reference to the range of a pre-defined value and a change in a difference from a previous frame.

Next, whether the missing value or the outlier value can be recovered is checked (S704). If the missing value or the outlier value cannot be recovered as a result of the check, motion key point information of a target frame is excluded (S705). In this case, whether the missing value or the outlier value can be recovered is checked by determining whether an abnormal pattern is generated, such as when a missing value or an outlier value is generated in a specific motion key point of continued frames consecutively or repeatedly or when the number of key points in which a missing value or an outlier value is generated falls outside a specific range. For such check, a pre-defined value may be used as reference.

In contrast, if the missing value or the outlier value can be recovered as a result of the check, the missing value or outlier value of the motion key point information is recovered (S706).

In an embodiment, the recovery of the missing value or outlier value may include substituting the missing value or outlier value with a value between key points in two neighboring frames. For example, when a key point in a current frame is a missing value, a corresponding key point value may be fetched from frames right before and after the current frame, and the missing value may be substituted with the corresponding key point value.

Alternatively, the recovery of the missing value or outlier value may be performed in a way to estimate input frame information based on previous frame information and to predict next frame information. For example, a missing value or outlier value in a current frame may be estimated based on information of a previous frame, and may be recovered based on the estimated value. Alternatively, next frame information may be predicted based on previous frame information, and a missing value or outlier value of a current frame may be substituted with the predicted value.

In another embodiment, the recovery of the missing value or outlier value may include recovering a missing value or outlier value part for key point information in a previous frame and key point information in an input frame based on an adaptive filtering algorithm. This means that input key point information is recovered based on accumulated key point information including a previous frame.

That is, in an embodiment of the present disclosure, as the adaptive filtering algorithm is applied, weight update, filter output calculation, and error calculation processes are performed on all of data. In other words, an initial weight is set, and the adaptive filtering update rule is repeatedly applied by a total number of input data.

First, it is assumed that the indices of continued data are $n=1, 2, \ldots, N$, input data are $x(n)$, and the weight vector of n-th data is $\omega(n)$. Furthermore, a predicted output value of a filter is calculated by incorporating a current weight into motion key point information in a current input frame. An error between the predicted output value of the filter and an actual output value of the filter is calculated. Next, a weight is updated based on the calculated error, the current weight, and the motion key point information in the current input frame. Such a process is repeated and performed on all of data. As the repetition and execution of the process is completed, recovery may be performed as the predicted output value of the filter according to the updated weight. A routine in which a missing value or an outlier value is substituted through the process that includes weight update, filter output calculation, and error calculation and that is repeated is as follows. In this case, $\mu$ is a learning ratio, $e(n)$ is an error, $y(n)$ is a predicted output, and $d(n)$ is an actual output. In this case, the learning ratio is used as a parameter that adjusts an update speed.

1: Start
2: The number of data: N
3: Set an initial value. Initial weight: $\omega(0)$ and a learning ratio: $\mu$
4: Perform an adaptive filtering repetition sentence on each datum
5: Current input data: $x(n)$
6: Calculate a filter output: $y(n)=\omega^T(n)\cdot x(n)$
7: Calculate an error: $e(n)=d(n)-y(n)$
8: Update a weight: $\omega(n+1)=\omega(n)+\mu\cdot e(n)\cdot x(n)$
9: End of the repetition sentence
10: Substitute a missing value or an outlier value
11: End Adaptive filtering may be applied to all of data through the process. A missing value or outlier value of a key point may be predicted and substituted.

Next, the motion key point information of the normal category determined in step S702 or the motion key point information recovered in step S706 is determined as motion determination target key point information. The error recovery process is terminated (S707).

Figure 8:
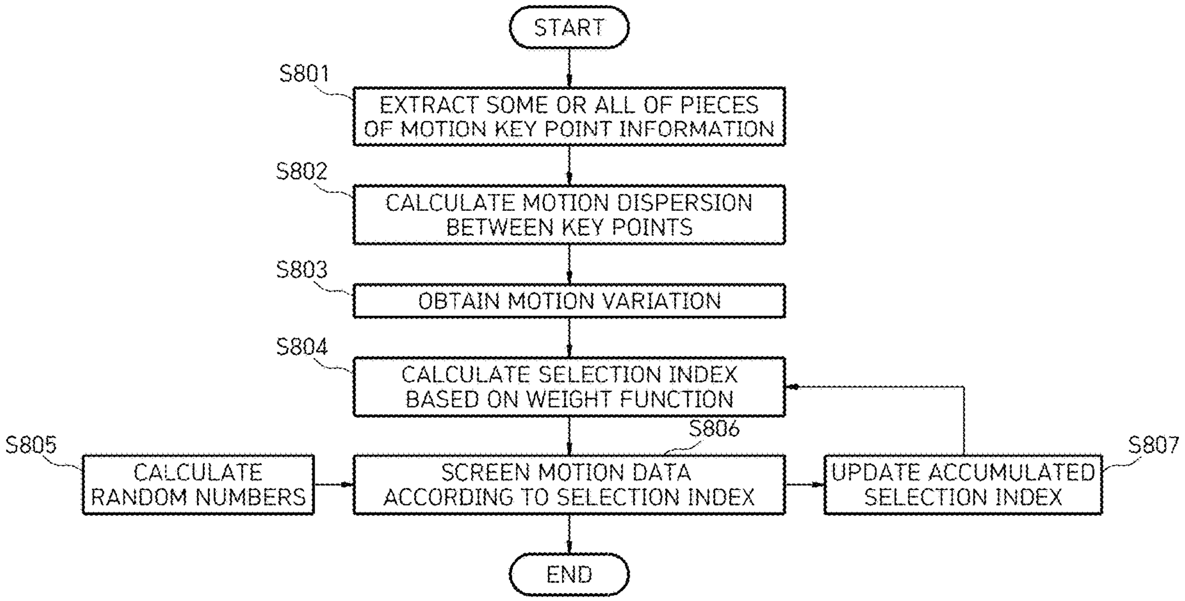
FIG. 8 is a diagram for specifically describing a step of screening motion data based on a motion variation in an embodiment of the present disclosure.
Figure 9:
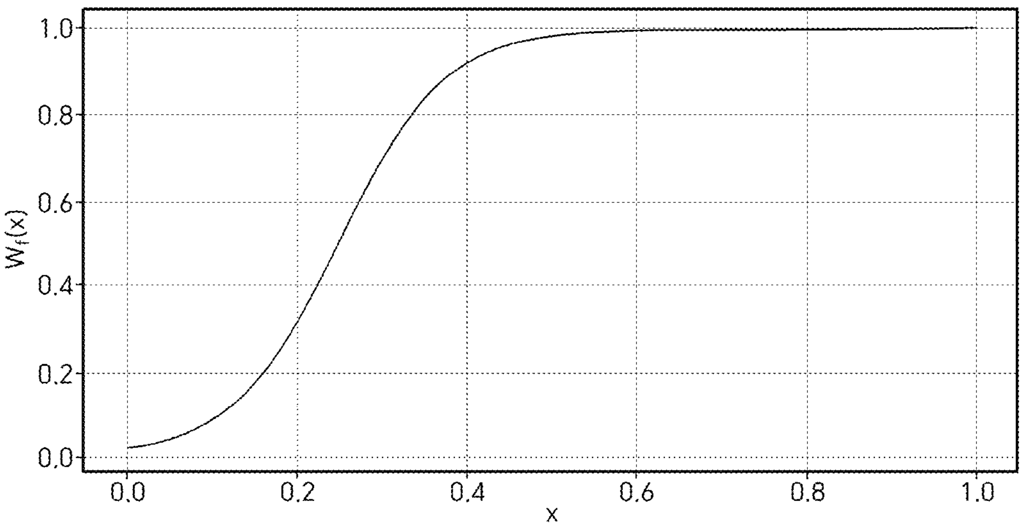
FIG. 9 is a diagram illustrating an example of a weight function in an embodiment of the present disclosure.

FIG. 8 is a diagram for specifically describing a step of screening motion data based on a motion variation in an embodiment of the present disclosure. FIG. 9 is a diagram illustrating an example of a weight function in an embodiment of the present disclosure.

First, some or all of pieces of motion key point information corresponding to motion data is extracted (S801). In this case, the motion key point information may be motion key point information extracted from an input motion data set or corrected motion key point information.

Next, a motion variation is obtained by calculating movement dispersion between key points with respect to the extracted motion key point information (S802 and S803). In this case, the dispersion of a moving path length for information of all of motion key points or information on the motion key point of a specific part is applied to the movement dispersion. Accordingly, the length of the entire moving path may be calculated by calculating a distance between key points in each frame. A motion variation may be obtained as a total variation or average variation of a motion by calculating the sum or an average of the entire distance. Accordingly, how much the moving path of a key point has been changed may be checked. Alternatively, a motion variation may be obtained by calculating a difference between a current location of each key point and a location in a frame right before the current location.

Next, a selection index for the screening of motion data is calculated by applying a weight function to the motion variation (S804). Random numbers are generated (S805). Motion data according to the selection index are screened (S806). Next, the selection index is updated (S807). The updated selection index is used in step S804 of calculating the selection index based on the weight function.

In this case, the weight function compresses the range of the motion variation between 0 and 1 or −1 and 1 so that a weight converges on 1 as the motion variation is increased and converges on 0 or −1 as the motion variation is decreased, and thus the motion variation has a selection index corresponding to a weight. That is, the output of the weight function has a value between 0 and 1 or −1 and 1.

Referring to FIG. 9, in an embodiment of the present disclosure, the weight function has a characteristic in that the weight function compresses the input range of a motion variation to a proper range value of −x to x and a weight converges on 1 as a motion variation is increased and converges on 0 as the motion variation is decreased. Furthermore, the weight function may be an asymmetric sigmoid function having asymmetry by adjusting a slope and an intermediate value so that the left and right of the intermediate value have different inclinations. Such a weight function ($w_f(x)$) may be expressed like Equation 2.

$$w_f(x) = \frac{1}{1 + e^{-k\cdot(x-(x_0+x_s))}} \tag{2}$$

In Equation 2, k indicates a parameter that adjusts the slope of the weight function, and is set as a positive number. The parameter is constructed so that a slope on the right side on which a motion variation is great is steeper than a slope on the left side on which a motion variation is small. Furthermore, $x_0$ is a parameter indicative of the center of the weight function, and is set as a negative number. The parameter assigns asymmetry on the left and right sides, and has a high output weight value for all of data by making an intermediate value output of a weight leans toward the left side on which a motion variation is small. Furthermore, $x_s$ is a parameter for moving the entire range of all of values x, and has only to be adjusted and used based on the range of an input value. In the embodiment, the parameter $x_s$ was set as the value of a positive number and moved to the area of the positive number on the right side, and the value x was normalized and used as a value between 0 and 1. In FIG. 9, 0.8 was applied to k, −5 was applied to $x_0$, and 10 was applied to $x_s$. The values may be adjusted according to an embodiment.

Thereafter, in the step of screening motion data based on a selection index by applying the weight function, a method of selecting data having a weight that is equal to or greater than a predetermined threshold value may be used. Alternatively, a method of setting two or more threshold value sections, selecting all of data having a first threshold value or more, excluding data having a second threshold value or less, and probabilistically selecting data between the first and second threshold values or selecting the data by assigning a weight to which a selection index based on the weight function has been applied may be used.

In the description, each of steps S401 to S807 may be further divided into additional steps or the steps may be combined into smaller steps depending on an implementation example of the present disclosure. Furthermore, some of the steps may be omitted, if necessary, and the sequence of the steps may be changed. Furthermore, the contents of FIGS. 1 to 3 and the contents of FIGS. 4 to 9, although some contents are omitted, may be mutually applied.

The system 100 and method for screening motion data according to the embodiments of the present disclosure according to embodiments of the present disclosure may be implemented in the form of a program (or application) in order to be executed in combination with a computer, that is, hardware, and may be stored in a medium.

The aforementioned program may include a code coded in a computer language, such as C, C++, JAVA, Python, or a machine language which is readable by a processor (CPU) of a computer through a device interface of the computer in order for the computer to read the program and execute the methods implemented as the program. Such a code may include a functional code related to a function, etc. That defines functions necessary to execute the methods, and may include an execution procedure-related control code necessary for the processor of the computer to execute the functions according to a given procedure. Furthermore, such a code may further include a memory reference-related code indicating at which location (address number) of the memory inside or outside the computer additional information or media necessary for the processor of the computer to execute the functions needs to be referred. Furthermore, if the processor of the computer requires communication with any other remote computer or server in order to execute the functions, the code may further include a communication-related code indicating how the processor communicates with the any other remote computer or server by using a communication module of the computer and which information or media needs to be transmitted and received upon communication.

The stored medium means a medium, which semi-permanently stores data and is readable by a device, not a medium storing data for a short moment like a register, cache, or a memory. Specifically, examples of the stored medium include ROM, RAM, CD-ROM, a magnetic tape, a floppy disk, optical data storage, etc., but the present disclosure is not limited thereto. That is, the program may be stored in various recording media in various servers which may be accessed by a computer or various recording media in a computer of a user. Furthermore, the medium may be distributed to computer systems connected over a network, and a code readable by a computer in a distributed way may be stored in the medium.

The description of the present disclosure is illustrative, and a person having ordinary knowledge in the art to which the present disclosure pertains will understand that the present disclosure may be easily modified in other detailed forms without changing the technical spirit or essential characteristic of the present disclosure. Accordingly, it should be construed that the aforementioned embodiments are only illustrative in all aspects, and are not limitative. For example, elements described in the singular form may be carried out in a distributed form. Likewise, elements described in a distributed form may also be carried out in a combined form.

The scope of the present disclosure is defined by the appended claims rather than by the detailed description, and all changes or modifications derived from the meanings and scope of the claims and equivalents thereto should be interpreted as being included in the scope of the present disclosure.

DESCRIPTION OF REFERENCE NUMERALS

100: system for screening motion data
110: motion data extraction unit
120: motion data refining unit
130: motion data determination unit
140: motion data screening unit
150: reference motion model

What is claimed is:

1. A method that is performed by a system for screening motion data, the method comprising:

extracting motion key point information from a motion data set;

determining whether motion data corresponding to the extracted motion key point information are valid data based on at least one of predetermined auxiliary information and a pre-stored reference motion model;

screening motion data for learning from the motion data set based on a motion variation of the motion data when the motion data are valid data as a result of the determination;

detecting an error of motion data corresponding to the extracted motion key point information based on the reference motion model after extracting the motion key point information from the motion data set; and recovering the detected error of the motion data, wherein the recovering of the detected error of the motion data comprises:

determining whether the motion key point information belongs to a preset normal category;

detecting a missing value or outlier value of the motion key point information when the motion key point information does not belong to the normal category; and recovering the missing value or the outlier value when the missing value or the outlier value is able to be recovered and excluding the motion key point information when the missing value or the outlier value is unable to be recovered, based on whether the missing value or the outlier value is able to be recovered.

2. The method of claim 1, further comprising generating a unique value of the motion data, comprising at least one of motion doer profile information, data type information, and initial motion key point information of the motion data set.

3. The method of claim 2, wherein the generating of the unique value of the motion data comprises:

extracting at least one of the motion doer profile information, the data type information, and the initial motion key point information from the motion data set;

converting the extracted motion doer profile information, data type information, and initial motion key point information into character strings, respectively, and combining the character strings;

calculating a message digest by applying a hash function to the combined character string; and generating the unique value by combining a current timestamp with the message digest.

4. The method of claim 1, wherein the recovering of the detected error of the motion data comprises:

selecting two or more major points that constitute a body with respect to the motion key point information and normalizing the key points;

determining similarity for each reference motion model based on reference key point information for the reference motion model and similarity between the normalized key points; and recovering an error of the motion data based on a reference motion of a reference motion model determined to be similar as a result of the determination and recovery information between pre-stored reference motion models.

5. The method of claim 1, wherein the recovering of the missing value or the outlier value when the missing value or the outlier value is able to be recovered and the excluding of the motion key point information when the missing value or the outlier value is unable to be recovered, based on whether the missing value or the outlier value is able to be recovered, comprises steps of:

calculating a predicted output value of a filter by incorporate a current weight into motion key point information in a current input frame;

calculating an error between the predicted output value of the filter and an actual output value;

updating a weight based on the calculated error, a current weight, and the motion key point information in the current input frame; and performing the recovery as the predicted output value of the filter according to a weight updated as the repetition and execution of the steps for all of data are completed.

6. The method of claim 1, wherein the determining of whether the motion data corresponding to the extracted motion key point information are valid data comprises determining whether the motion data are valid data, based on the auxiliary information comprising at least one of speech voice information included in the motion data, speech voice information that is constructed independently of the motion data, and annotation information corresponding to the motion data.

7. The method of claim 1, wherein the screening of the motion data for learning from the motion data set based on the motion variation of the motion data comprises:

obtaining a motion variation by calculating movement dispersion between key points with respect to some or all of pieces of motion key point information corresponding to the motion data;

calculating a selection index for screening motion data by applying a weight function to the motion variation; and screening motion data according to the selection index so that the motion data correspond to generated random numbers.

8. The method of claim 7, wherein the obtaining of the motion variation by calculating the movement dispersion between the key points with respect to the some or all of pieces of motion key point information corresponding to the motion data comprises obtaining the motion variation based on a distance between pieces of motion key point information in each frame of the motion data or obtaining the motion variation based on a difference between locations of pieces of motion key point information in a previous frame and a current frame.

9. A system for screening motion data, comprising:

a motion data extraction unit configured to extract motion key point information from a motion data set;

a motion data determination unit configured to determine whether motion data corresponding to the extracted motion key point information are valid data based on at least one of predetermined auxiliary information and a pre-stored reference motion model;

a motion data screening unit configured to screen motion data for learning from the motion data set based on a motion variation of the motion data when the motion data are valid data as a result of the determination; and a data refining unit comprising:

an error detection unit configured to detect an error of motion data corresponding to the extracted motion key point information based on the reference motion model after extracting the motion key point information from the motion data set, and an error recovery unit configured to recover the detected error of the motion data, wherein the error recovery unit determines whether the motion key point information belongs to a preset normal category, detects a missing value or outlier value of the motion key point information when the motion key point information does not belong to the normal category, and recovers the missing value or the outlier value when the missing value or the outlier value is able to be recovered and excludes the motion key point information when the missing value or the outlier value is unable to be recovered, based on whether the missing value or the outlier value is able to be recovered.

10. The system of claim 9, wherein the motion data extraction unit comprises a unique value extraction unit configured to generate a unique value of the motion data, comprising at least one of motion doer profile information, data type information, and initial motion key point information of the motion data set.

11. The system of claim 10, wherein the unique value extraction unit extracts at least one of the motion doer profile information, the data type information, and the initial motion key point information from the motion data set, converts the extracted motion doer profile information, data type information, and initial motion key point information into character strings, respectively, combines the character strings, calculates a message digest by applying a hash function to the combined character string, and generates the unique value by combining a current timestamp with the message digest.

12. The system of claim 9, wherein the error recovery unit selects two or more major points that constitute a body with respect to the motion key point information, normalizes the key points, determines similarity for each reference motion model based on reference key point information for the reference motion model and similarity between the normalized key points, and recovers an error of the motion data based on a reference motion of a reference motion model determined to be similar as a result of the determination and recovery information between pre-stored reference motion models.

13. The system of claim 9, wherein the error recovery unit performs an operation of calculating a predicted output value of a filter by incorporate a current weight into motion key point information in a current input frame, calculating an error between the predicted output value of the filter and an actual output value, and updating a weight based on the calculated error, a current weight, and the motion key point information in the current input frame, and performs the recovery as the predicted output value of the filter according to a weight updated as the repetition and execution of the operation for all of data are completed.

14. The system of claim 9, wherein the motion data determination unit determines whether the motion data are valid data, based on the auxiliary information comprising at least one of speech voice information included in the motion data, speech voice information that is constructed independently of the motion data, and annotation information corresponding to the motion data.

15. The system of claim 9, wherein the motion data screening unit obtains a motion variation by calculating movement dispersion between key points with respect to some or all of pieces of motion key point information corresponding to the motion data, calculates a selection index for screening motion data by applying a weight function to the motion variation, and screens motion data according to the selection index so that the motion data correspond to generated random numbers.

16. The system of claim 15, wherein the motion data screening unit comprises a motion variation determination unit configured to obtain the motion variation based on a distance between pieces of motion key point information in each frame of the motion data or to obtain the motion variation based on a difference between locations of pieces of motion key point information in a previous frame and a current frame.

* * * * *